Jan. 16, 1934.  S. N. KOULICHKOV ET AL  1,943,534
CLUTCH CONTROL
Filed May 4, 1932  2 Sheets-Sheet 1

SERGY N. KOULICHKOV
JOHN J. DRABIN
INVENTORS

BY John P. Nikonow
ATTORNEY

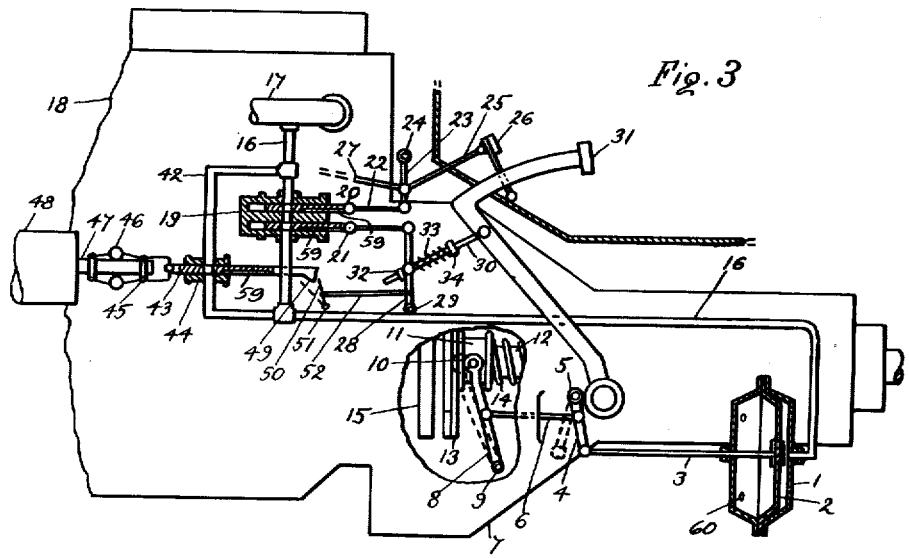
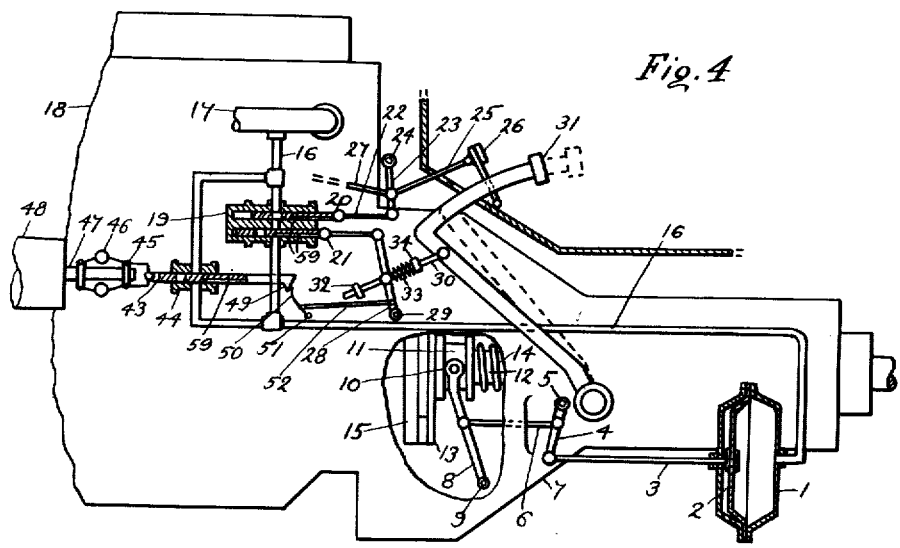
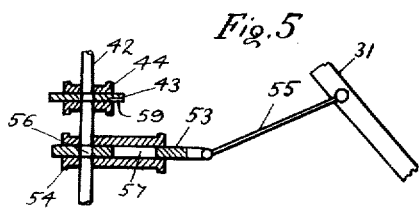
SERGY N. KOULICHKOV
JOHN J. DRABIN
INVENTORS

Patented Jan. 16, 1934

1,943,534

UNITED STATES PATENT OFFICE 1,943,534

CLUTCH CONTROL

Sergy N. Koulichkov and John J. Drabin, New York, N. Y.

Application May 4, 1932. Serial No. 609,224

7 Claims. (Cl. 192—.01)

Our invention relates to a clutch control for automobiles and has a particular reference to clutches operated by vacuum motors.

Vacuum motors for clutches are usually connected by a pipe leading from the intake manifold. Valves are provided in this pipe mechanically connected with the accelerator pedal and a special button or lever. Such an arrangement renders the operation of the system rather complicated, requiring a constant attention to the additional button or pedal.

We discovered, however, that it is possible to provide an arrangement whereby such extra or additional pedals can be dispensed with. For this purpose we provide separate valves controlled by the brake and accelerator pedals, with an automatic valve controlled by a centrifugal governor.

Our invention is more fully described in the accompanying specification and drawings in which—

Figure 1:
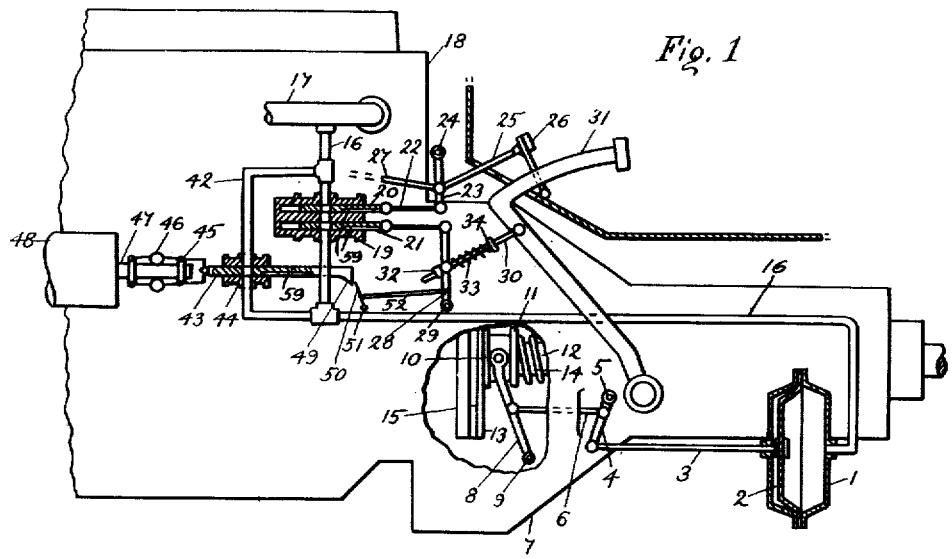
Figure 2:
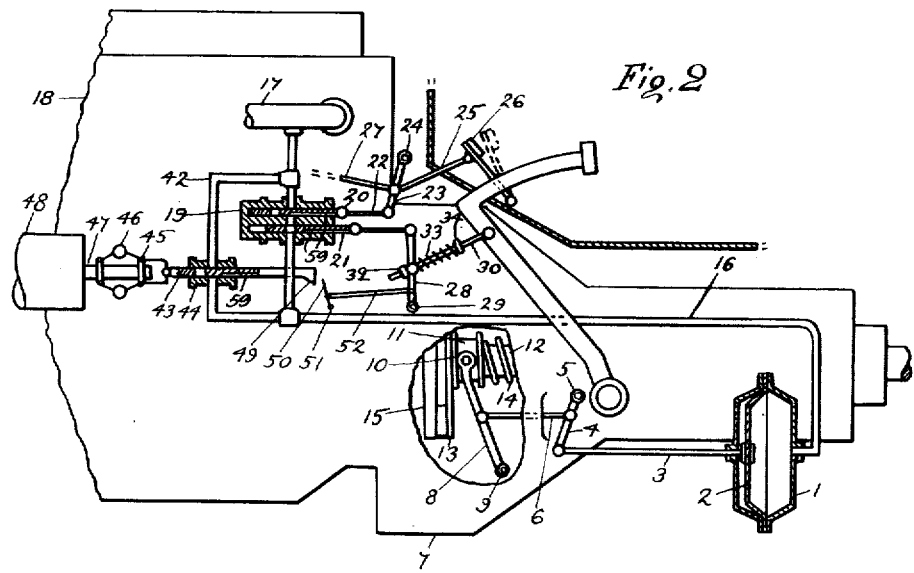

Fig. 1 is a diagrammatic view of our arrangement with the engine not running, Fig. 2 is the same arrangement shown with the accelerator pedal depressed and the engine running. Fig. 3 is the same arrangement with the engine idling or running at a low speed, Fig. 4 is an arrangement with the brake pedal depressed, and Fig. 5 is a partial view of a modified arrangement.

The transmission case is shown partly opened on the above drawings so as to expose to view the clutch with its levers.

On the drawings numeral 1 designates a vacuum motor of an ordinary construction. It represents a closed chamber with a flexible diaphragm 2 inside. A rod 3 is attached to the diaphragm at one end, the other end being connected with a lever 4 supported on a pivot 5. A rod 6 extends from this lever into the transmission case 7 and is connected with another lever 8 supported inside on a pivot 9. The end of the lever 8 has a fork with rollers 10 engaging a sliding bushing 11 on a transmission shaft 12. The bushing is placed between a clutch plate 13 and a spring 14 which presses the clutch plate against the face of a flywheel 15.

A feed pipe 16 connects the chamber 1 with an intake manifold 17 of the engine 18. A valve housing 19 is placed on the pipe 16 and is provided with sliding valves 20 and 21. The valve 20 is connected by a rod 22 with a lever 23 supported on a pivot 24 and connected by a rod 25 with an accelerator pedal 26. A rod 27, shown broken, connects the accelerator with the throttle valve of a carburetor (not shown). The valve 21 is connected with a lever 28 supported on a pivot 29 and connected by a rod 30 with the brake pedal 31.

The rod 30 slides freely in a corresponding hole in the lever 28 and is provided with a button or enlargement 32 engaging the lever 28 during the return movement of the pedal 31. Direct or operating pressure from the brake pedal 31 is transmitted through a spring 33 resting against a button or enlargement 34. This arrangement permits the brake pedal to move through a large distance for a limited movement of the valve 21.

A bypass pipe 42 is connected with the pipe 16 around the valves 20 and 21 and is provided with a valve 43 sliding in a valve cage 44. The valve 43 is connected with a sliding bushing 45 of a centrifugal governor 46 on a shaft 47 of an electric generator 48 or similar rotating attachment. The valve 43 has an extension with a lug 49 adapted to be engaged by a resilient lever 50 mounted on a pivot 51. A rod 52 connects the lever 50 with the lever 28. The lug 49 is shaped so that while the lever 50 can push the valve 43 into a closed position, the lever 50 quickly snaps beyond the lug 49 and can return back sliding over the smooth inclined rear surface of the lug without moving the valve 43 back. The valves 20, 21 and 43 are provided with bleeder slots 59 connecting the respective pipes with the atmosphere when these valves are in a closed position.

Instead of a mechanical connection between the brake pedal 31 and the valve 43, a separate valve 53, Fig. 5, may be employed. This valve is placed in a cage 54 on the pipe 42 and is connected by a rod 55 with the brake pedal 31. In addition to its regular aperture 54, corresponding to the inoperative position of the pedal 31, the valve 53 has also an additional port 57 separated by a bridge from the port 54.

The operation of our system is as follows.

The valves 20, 21 and 43 are open when the engine is not running and the pedals are not operated. Fig. 1 represents such condition. If the engine is started and speeded up by depressing the accelerator pedal 26 (or otherwise operating the control of the carburetor throttle valve), as shown in Fig. 2, then the valve 20 is closed by the accelerator pedal, and the valve 43 by the action of the centrifugal governor 46. The latter may be set to close the valve when the engine speed exceeds certain low limit. Both pipes 16 and 42 being cut out from the manifold 17 and connected with the atmosphere through the bleeder slots 59, the vacuum motor 1 will remain inoperative, and the clutch 13 engaged. This is the normal running position of the devices. In order to release the clutch for shifting gears it is only necessary to release the pressure on the accelerator. This action will open the pipe 16 regardless of the speed of the engine (Fig. 3), so that the atmospheric pressure on the flexible diaphragm 2 will deflect it against the vacuum on the other side, caused by the suction from the intake manifold. The clutch will be then open, and the transmission ready for gear shifting operations. Upon completion of the gear shift the clutch will become again engaged as soon as the accelerator pedal is depressed.

If it is desired to use the engine as a brake, it is only necessary to press slightly on the brake pedal as shown in Fig. 4 thereby closing the valve 21. The atmospheric air is admitted into the chamber 1 through the bleeder slot 59. This action takes place during the first or idle portion of the brake pedal movement, so that the engine will be used as a brake even before the mechanical brakes begin to operate. Any further depression of the brake pedal does not change the operating conditions, and the engine remains connected with the transmission.

If at the moment of engaging the brake pedal the engine is idling and the valve 43 open, then the brake pedal 31 will close this valve by pressure on the lug 49 from the resilient lever 50 operated by the rod 52. When the brake pedal is pressed to the limit, the lever 50 snaps over the lug 49 and again releases the valve 43 which will be then open, if the engine runs at a sufficiently slow speed, permitting the gear shifting operations to take place.

In a modification shown in Fig. 5 the brake pedal 31 operates an additional valve 53, closing it during the first portion of the brake pedal travel. An additional port 57 opens the valve again when the brake pedal is depressed hard, bringing the car to a stop or to a very slow movement.

With our system the clutch pedal is not necessary and may be entirely omitted, there being only two pedals for operating the automobile: the brake pedal and the accelerator.

Our arrangement has the following important advantages:

1.—The transmission gears can be shifted as soon as the pressure on the accelerator pedal is released without the use of any other pedals, buttons etc.

2.—With our automatic clutch control it is possible to start the dead engine by pushing or towing the car, and to use the motor as a parking brake.

3.—In going down hill or in the other cases the engine can be used as a brake, by slight pressure on the brake pedal.

4. The degree of braking can be easily controlled by the amount of pressure brought on the brake pedal; beginning with the braking by the engine, then by the engine together with the brakes, and, finally, by the brakes alone.

5.—The engine becomes automatically disconnected from the transmission whenever the number of revolutions falls below a certain limit, so that the engine cannot be stalled by an inexperienced driver. The clutch then becomes automatically disconnected, so that the gears may be shifted without any other manipulations of the pedals.

6.—The operation of the automobile becomes greatly simplified, as only one foot is needed, alternately pressing on the brake pedal or accelerator. While driving the foot need not rest on any pedals except the accelerator.

7.—The automobile can be stopped with the gears in any position, as the engine becomes automatically disconnected.

8.—When starting in climbing hill it is not necessary to use a hand brake. One foot will be used to operate the accelerator, and the other for the brake pedal.

9.—Any excessive wear of the brakes may be prevented by the proper use of the engine in braking the automobile when going down a long hill.

10.—The driving through traffic and in a hilly country is greatly simplified by eliminating the undesirable stalling of the engine.

With our system it is preferable to have a separate throttle control lever on the steering wheel independent from the accelerator control. It then becomes possible to run the engine at higher speeds by the steering wheel lever with disconnected or released engine clutch, for instance, when starting up hill also when warming up the engine in cold weather when it will not run at its normal idling speed.

We claim as our invention:

1. In a clutch control, the combination with a vacuum motor, operative connections between said motor and the engine clutch of an automobile, said motor when in its operative condition being adapted to release said clutch, a pipe connecting said motor with the intake manifold of said engine, two valves in said pipe, one of said valves being operatively connected with the throttle control of said engine and being adapted to close said pipe when said throttle is opened, the other valve being operatively connected with the brake pedal and being adapted to close said pipe when said pedal is depressed, a bypass valve connected with said pipe in parallel with said first valves, engine operated means to close said bypass valve when the engine speed exceeds a predetermined low limit, and an operative connection between said bypass valve and said brake pedal adapted to close said bypass valve during the first portion of the movement of said pedal, said connection between the bypass valve and the brake pedal being adapted to become inoperative during the second portion of the operative movement of said brake pedal.

2. In a clutch control for an automobile, the combination with a vacuum motor, a pipe connecting said motor with the intake manifold of the automobile engine, said motor being adapted to release the clutch of said automobile when said motor is in operative condition, means to close said pipe by opening the throttle of said engine, means to close said pipe by operating the brake pedal, a bypass pipe around said pipe closing means, means to close said bypass pipe when the engine speed exceeds a predetermined low limit, and means to close said bypass pipe by the first portion of the movement of said brake pedal, said last named means being adapted to become inoperative with the further movement of said brake pedal.

3. In a clutch control for an automobile, the combination with an auxiliary motor for releasing the engine clutch, and means to render said motor inoperative when the brake pedal of said automobile is depressed through a portion of its total travel, said means being adapted to release said motor again when said brake pedal is fully depressed.

4. In a clutch control for an automobile, the combination with an auxiliary motor for releasing the engine clutch, means to render said motor inoperative when the brake pedal of said automobile is slightly depressed, and means to render said motor operative when the engine speed falls below a predetermined limit regardless of the position of the brake pedal.

5. In a clutch control for an automobile, the combination with a vacuum motor, a pipe connecting said motor with the intake manifold of the engine, operative connections between said motor and the engine clutch, said motor being adapted to release said clutch when there is vacuum in said manifold, two valves in said pipe, one of said valves being operatively connected with the accelerator pedal and being adapted to close said pipe when said pedal is depressed, the second valve being operatively connected with the brake pedal and being adapted to close said pipe when said brake pedal is depressed, a bypass pipe around said valves connected with said motor pipe, a valve in said bypass pipe, and a centrifugal governor operatively connected with said bypass valve and adapted to open said bypass valve when the engine speed falls below a predetermined low limit, said brake pedal being adapted during the first portion of its movement to close said bypass valve and being further adapted to release said bypass valve when fully depressed.

6. In a clutch control for an automobile, the combination with a vacuum motor, a pipe connecting said motor with the intake manifold of the engine of said automobile, operative connections between said motor and the engine clutch, said motor being adapted to release said clutch when there is vacuum in said manifold, two valves in said pipe, one of said valves being operatively connected with the accelerator pedal and being adapted to close said pipe when said pedal is depressed, the other valve being operatively connected with the brake pedal and being adapted to close said pipe when said brake pedal is depressed, a bypass pipe around said valves connected with said motor pipe, a valve in said bypass pipe, and means to open said bypass valve when the engine speed falls below a predetermined low limit, said brake pedal being adapted during the first portion of its movement to close said bypass valve and being further adapted to release said bypass valve when fully depressed.

7. In a clutch control for an automobile, the combination with a fluid operated motor, operative connections between said motor and the engine clutch, said motor when in its operative position being adapted to release said clutch, a fluid feed pipe for said motor, two valves in said pipe, one of said valves being adapted to open said pipe when the engine fuel valve is placed in its idling position, the second valve being adapted to close said pipe when the brake pedal is operated, a bypass pipe around said valves, a valve in said bypass pipe, means to open said bypass valve when the engine speed falls below a predetermined low limit thereby opening said feed pipe independently from the other valves, and means to release said bypass valve from said brake pedal when said brake pedal is fully depressed.

SERGY N. KOULICHKOV.
JOHN J. DRABIN.

DISCLAIMER 1,943,534.—*Sergy N. Koulichkov* and *John J. Drabin*, New York, N. Y. CLUTCH CONTROL. Patent dated January 16, 1934. Disclaimer filed December 7, 1934, by the assignee, *Bragg-Kliesrath Corporation*.

Hereby enters this disclaimer to that part of the claim in said specification which appears as claim No. 3, and which is in the following words, to wit:

"3. In a clutch control for an automobile, the combination with an auxiliary motor for releasing the engine clutch, and means to render said motor inoperative when the brake pedal of said automobile is depressed through a portion of its total travel, said means being adapted to release said motor again when said brake pedal is fully depressed."

[*Official Gazette January 1, 1935.*]

said motor again when said brake pedal is fully depressed.

4. In a clutch control for an automobile, the combination with an auxiliary motor for releasing the engine clutch, means to render said motor inoperative when the brake pedal of said automobile is slightly depressed, and means to render said motor operative when the engine speed falls below a predetermined limit regardless of the position of the brake pedal.

5. In a clutch control for an automobile, the combination with a vacuum motor, a pipe connecting said motor with the intake manifold of the engine, operative connections between said motor and the engine clutch, said motor being adapted to release said clutch when there is vacuum in said manifold, two valves in said pipe, one of said valves being operatively connected with the accelerator pedal and being adapted to close said pipe when said pedal is depressed, the second valve being operatively connected with the brake pedal and being adapted to close said pipe when said brake pedal is depressed, a bypass pipe around said valves connected with said motor pipe, a valve in said bypass pipe, and a centrifugal governor operatively connected with said bypass valve and adapted to open said bypass valve when the engine speed falls below a predetermined low limit, said brake pedal being adapted during the first portion of its movement to close said bypass valve and being further adapted to release said bypass valve when fully depressed.

6. In a clutch control for an automobile, the combination with a vacuum motor, a pipe connecting said motor with the intake manifold of the engine of said automobile, operative connections between said motor and the engine clutch, said motor being adapted to release said clutch when there is vacuum in said manifold, two valves in said pipe, one of said valves being operatively connected with the accelerator pedal and being adapted to close said pipe when said pedal is depressed, the other valve being operatively connected with the brake pedal and being adapted to close said pipe when said brake pedal is depressed, a bypass pipe around said valves connected with said motor pipe, a valve in said bypass pipe, and means to open said bypass valve when the engine speed falls below a predetermined low limit, said brake pedal being adapted during the first portion of its movement to close said bypass valve and being further adapted to release said bypass valve when fully depressed.

7. In a clutch control for an automobile, the combination with a fluid operated motor, operative connections between said motor and the engine clutch, said motor when in its operative position being adapted to release said clutch, a fluid feed pipe for said motor, two valves in said pipe, one of said valves being adapted to open said pipe when the engine fuel valve is placed in its idling position, the second valve being adapted to close said pipe when the brake pedal is operated, a bypass pipe around said valves, a valve in said bypass pipe, means to open said bypass valve when the engine speed falls below a predetermined low limit thereby opening said feed pipe independently from the other valves, and means to release said bypass valve from said brake pedal when said brake pedal is fully depressed.

SERGY N. KOULICHKOV.
JOHN J. DRABIN.

DISCLAIMER 1,943,534.—*Sergy N. Koulichkov* and *John J. Drabin*, New York, N. Y. CLUTCH CONTROL. Patent dated January 16, 1934. Disclaimer filed December 7, 1934, by the assignee, *Bragg-Kliesrath Corporation*.

Hereby enters this disclaimer to that part of the claim in said specification which appears as claim No. 3, and which is in the following words, to wit:

"3. In a clutch control for an automobile, the combination with an auxiliary motor for releasing the engine clutch, and means to render said motor inoperative when the brake pedal of said automobile is depressed through a portion of its total travel, said means being adapted to release said motor again when said brake pedal is fully depressed."

[*Official Gazette January 1, 1935.*]